US009726523B2

(12) United States Patent
Austin et al.

(10) Patent No.: US 9,726,523 B2
(45) Date of Patent: Aug. 8, 2017

(54) OPTICAL MONITORING SYSTEM (71) Applicant: STINGRAY GEOPHYSICAL LTD, Surbiton (GB)

(72) Inventors: Edward Alfred Denzil Austin, Netley Abbey (GB); Philip Nash, London (GB)

(73) Assignee: STINGRAY GEOPHYSICAL INC., Pointe-Claire (CA)

( * ) Notice: Subject to any disclaimer, the term of this patent is extended or adjusted under 35 U.S.C. 154(b) by 390 days.

(21) Appl. No.: 14/412,643

(22) PCT Filed: Jul. 4, 2013

(86) PCT No.: PCT/EP2013/064203
§ 371 (c)(1),
(2) Date: Jan. 2, 2015

(87) PCT Pub. No.: WO2014/006168
PCT Pub. Date: Jan. 9, 2014

(65) Prior Publication Data
US 2015/0185052 A1 Jul. 2, 2015

(30) Foreign Application Priority Data

Jul. 4, 2012 (GB) .................................. 1211865.9

(51) Int. Cl.
*G02B 6/04* (2006.01)
*G01D 5/26* (2006.01)
*G01V 1/00* (2006.01)
*G01V 1/22* (2006.01)
*G01D 5/353* (2006.01)

(52) U.S. Cl.
CPC .......... *G01D 5/268* (2013.01); *G01D 5/35383* (2013.01); *G01D 5/35387* (2013.01); *G01V 1/226* (2013.01)

(58) Field of Classification Search
CPC ........ G01V 1/26; G01D 5/268; G01D 5/35383
USPC ........ 385/12, 13, 14, 15, 16, 88; 250/227.18; 257/227.12, 227.14; 356/345, 478, 349; 367/64, 149; 359/237
See application file for complete search history.

(56) References Cited

U.S. PATENT DOCUMENTS 4,775,216 A * 10/1988 Layton ............... G01D 5/35383
250/227.12
5,191,208 A 3/1993 Slemon et al.
(Continued)

FOREIGN PATENT DOCUMENTS

CN 101277151 A 10/2008
EP 1169619 A1 1/2002
(Continued)

OTHER PUBLICATIONS

International Search Report from PCT/EP2013/064203; mailed Apr. 1, 2014.

*Primary Examiner* — Akm Enayet Ullah
(74) *Attorney, Agent, or Firm* — Baker & Hostetler LLP (57) ABSTRACT

An optical monitoring system comprising first and second sensor arrays interrogated via first and second optical connections from an interrogator location. The system is configured such that no wavelength is carried bi-directionally in the first and second optical connections. In typical systems the optical connections comprise trunk cables from the sensor arrays to the interrogator location.

10 Claims, 7 Drawing Sheets

(56) References Cited

U.S. PATENT DOCUMENTS

| | | | | |
|---|---|---|---|---|
| 5,696,857 | A * | 12/1997 | Frederick | G01D 5/35383 385/12 |
| 6,785,447 | B2 * | 8/2004 | Yoshimura | G02B 6/10 257/E23.01 |
| 6,990,260 | B2 * | 1/2006 | Tietjen | G01H 9/004 359/237 |
| 7,039,276 | B2 * | 5/2006 | Aldridge | B64D 43/00 385/39 |
| 7,305,153 | B2 * | 12/2007 | Meyer | G01D 5/35383 356/478 |
| 7,387,451 | B2 * | 6/2008 | Goossen | G02B 6/4214 385/39 |
| 7,622,706 | B2 * | 11/2009 | Maas | G01V 1/201 250/227.14 |
| 8,189,200 | B2 * | 5/2012 | Menezo | G01D 5/35303 356/478 |
| 2001/0013934 | A1 | 8/2001 | Varnham et al. | |

FOREIGN PATENT DOCUMENTS

| | | |
|---|---|---|
| EP | 2081053 A2 | 7/2009 |
| GB | 2391124 A | 1/2004 |
| WO | 2011/148154 A1 | 12/2011 |
| WO | 2012/076873 A2 | 6/2012 |

* cited by examiner

Figure 1

| ITU No | Wavelength (nm) | First Set | Second Set |
|---|---|---|---|
| 57 | 1531.9 | | 1 |
| 56 | 1532.68 | | 2 |
| 55 | 1533.47 | | 3 |
| 54 | 1534.25 | | 4 |
| 53 | 1535.04 | | 5 |
| 52 | 1535.82 | | 6 |
| 51 | 1536.61 | | 7 |
| 50 | 1537.4 | | 8 |
| 49 | 1538.19 | | |
| 48 | 1538.98 | | 9 |
| 47 | 1539.77 | | 10 |
| 46 | 1540.56 | | 11 |
| 45 | 1541.35 | | 12 |
| 44 | 1542.14 | | 13 |
| 43 | 1542.94 | | 14 |
| 42 | 1543.73 | | 15 |
| 41 | 1544.53 | | 16 |
| 40 | 1545.32 | | |
| 39 | 1546.12 | | |
| 38 | 1546.92 | 1 | |
| 37 | 1547.72 | 2 | |
| 36 | 1548.51 | 3 | |
| 35 | 1549.32 | 4 | |
| 34 | 1550.12 | 5 | |
| 33 | 1550.92 | 6 | |
| 32 | 1551.72 | 7 | |
| 31 | 1552.52 | 8 | |
| 30 | 1553.33 | | |
| 29 | 1554.13 | 9 | |
| 28 | 1554.93 | 10 | |
| 27 | 1555.75 | 11 | |
| 26 | 1556.55 | 12 | |
| 25 | 1557.36 | 13 | |
| 24 | 1558.17 | 14 | |
| 23 | 1558.98 | 15 | |
| 22 | 1559.79 | 16 | |

OPTICAL MONITORING SYSTEM

CROSS-REFERENCE TO RELATED APPLICATIONS

This application is a National Stage of International patent application PCT/EP2013/064203, filed on Jul. 4, 2013, which claims priority to foreign United Kingdom patent application No. GB 1211865.9, filed on Jul. 4, 2012, the disclosures of which are incorporated by reference in their entirety.

BACKGROUND

This invention relates to optical monitoring systems.

Optical sensors provide a convenient method of monitoring a range of physical properties of a location. The relative simplicity and robustness of optical sensors and the ability to locate the sensor significant distances from more complex interrogation hardware make optical systems particularly attractive where the sensor is to be located in hostile environments.

A particular family of optical sensing systems utilises a light source and detector (interrogator) located at a convenient interrogator location some distance from the actual sensors, with a fibre optic connection between. A particular application of such sensing systems is the marine oil and gas industry for seismic sensing, where the sensors are located on the sea floor and the interrogation location is on a surface platform or vessel.

Connecting the sensors to the interrogator requires a reliable optical connection extending over considerable distances. Particularly in the marine environment that connection is provided by specialist optical cables which are cumbersome and costly. A principle factor in the cost of the connection cable is the number of optical fibres and connectors utilised.

There is therefore a requirement to reduce the number of optical fibres utilised to connect an interrogator system to sensor arrays.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical sensing system, comprising an interrogator system comprising a first optical signal source configured to output a first set of optical interrogation signals; a second optical signal source configured to output a second set of optical interrogation signals, the wavelengths of the first and second sets of optical interrogation signals being distinct; a first optical sensor array configured to be interrogated by the first set of optical interrogation signals; a second optical sensor array configured to be interrogated by the second set of optical interrogation signals; a first optical receiver, for receiving the first set of optical interrogation signals; a second optical receiver for receiving the second set of optical interrogation signals a first optical connection for coupling the first set of optical interrogation signals from the first optical signal source to the first sensor array, and for coupling optical signals from the second sensor array to the second optical receiver; and a second optical connection for coupling the second set of optical interrogation signals from the second optical signal source to the second sensor array, and for coupling optical signals from the first sensor array to the first optical receiver.

There is also provided an optical sensing system, comprising an interrogator system comprising a first optical signal source configured to output a first set of optical interrogation signals; a second optical signal source configured to output a second set of optical interrogation signals, the wavelengths of the first and second sets of optical interrogation signals being distinct; a first primary optical sensor array configured to be interrogated by the first set of optical interrogation signals and a first secondary optical sensor array configured to be interrogated by the second set of optical interrogation signals; a second primary optical sensor array configured to be interrogated by the second set of optical interrogation signals and a second secondary optical sensor array configured to be interrogated by the first set of optical interrogation signals; a first optical receiver, for receiving the first set of optical interrogation signals; a second optical receiver for receiving the second set of optical interrogation signals; a first optical connection for coupling the first set of optical interrogation signals from the first optical signal source to the first primary sensor array, the second set of optical interrogation signals from the second optical signal source to the first secondary sensor array, the second set of optical interrogation signals from the second primary sensor array to the second optical receiver, and the first set of optical interrogation signals from the second secondary sensor array to the first optical receiver, a second optical connection for coupling the second set of optical interrogation signals from the second optical signal source to the second primary sensor array, the first set of optical interrogation signals from the first optical signal source to the second secondary sensor array, the first set of optical interrogation signals from the first primary sensor array to the first optical receiver, and the second set of optical interrogation signals from the first secondary sensor array to the second optical receiver, wherein the system is configured such that each wavelength does not propagate bidirectionally in the first or second optical connection by interrogating only the primary or only the secondary sensors arrays at any time.

There is also provided an optical sensing system, comprising an interrogator system comprising a first optical signal source configured to output a first set of optical interrogation signals; a second optical signal source configured to output a second set of optical interrogation signals, the wavelengths of the first and second sets of optical interrogation signals being distinct; a first optical sensor array configured to be interrogated by the first set of optical interrogation signals and by the second set of optical interrogation signals; a second optical sensor array configured to be interrogated by the second set of optical interrogation signals and by the first set of optical interrogation signals; a first optical receiver, for receiving the first set of optical interrogation signals; a second optical receiver for receiving the second set of optical interrogation signals; a first optical connection for coupling the first and second sets of optical interrogation signals from the first and second optical signal sources to the first sensor array, and the first and second sets of optical interrogation signals from the second secondary sensor array to the first and second optical receivers, a second optical connection for coupling the first and second sets of optical interrogation signals from the first and second optical signal sources to the second sensor array, and the first and second sets of optical interrogation signals from the first sensor array to the first and second optical receivers, wherein the system is configured such that each wavelength does not propagate bidirectionally in the first or second optical connection.

A selection of optional features are set out in the dependent claims.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

In a conventional system a pair of trunk fibres (transmit and return) is used to interrogate each sensor array. Time, wavelength, and other multiplexing techniques are utilised in optical sensor systems to increase the number of sensors that can be interrogated through each pair of trunk fibres. However, an indefinite increase in number of sensors is not possible. The number of sensors that can be time division multiplexed is limited by the required optical signal pulse width to receive a reliable signal, and the repetition rate of the optical pulses required for the bandwidth defined for the system. The number of signals that can be wavelength division multiplexed is limited by spectral performance of multiplexing technologies, available optical bandwidth, and limits on optical power in trunk fibres. The limit on optical power is due to the occurrence of non-linear effects in the trunk fibres, which effects are a function of total optical power (regardless of wavelengths), and include Four Wave Mixing (FWM) effects between wavelengths. The total number of wavelengths cannot therefore be increased beyond a certain point without reducing the per-wavelength power. However, a reduction in power leads to a reduction in Optical Signal to Noise Ratio (OSNR) and hence a degradation in system performance.

A single bi-directional fibre can be used to interrogate each array, thereby reducing trunk fibre count, but this is undesirable as scatter from the high power interrogation signals degrades the signal quality of the returning low power signals.

Figure 1:
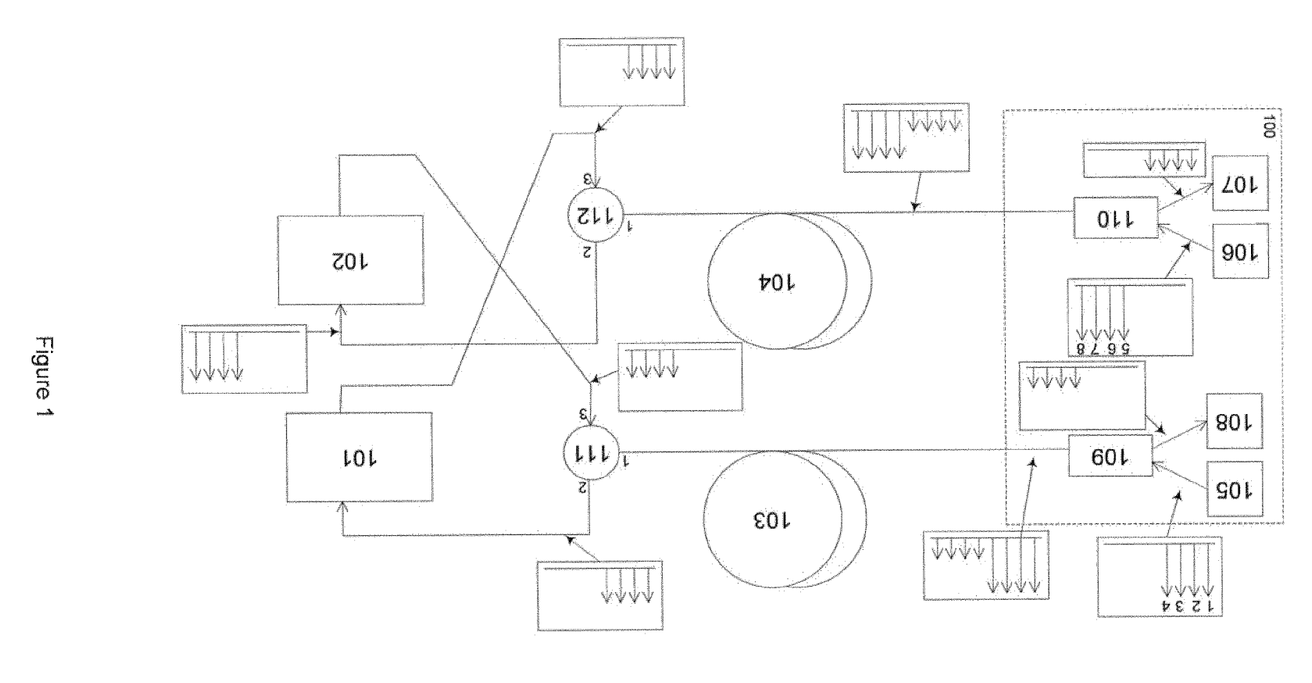
FIG. 1 shows a schematic diagram of an optical sensing system.

FIG. 1 shows a schematic diagram of an optical sensor system allowing an increase in the number of sensors interrogated via each pair of trunk fibres.

An interrogator system 100 is connected to first and second sensor arrays 101, 102 via a pair of trunk fibres 103, 104. Interrogator system 100 comprises first and second interrogation signal sources 105, 106. Each interrogation signal source 105, 106 outputs a plurality of interrogation signals, each at a different wavelength. In the example shown schematically in FIG. 1, first interrogation signal source 105 outputs wavelengths 1-4, while second interrogation signal source 106 outputs wavelengths 5-8. These wavelength numbers are arbitrary and for example only. Specific examples of wavelength plans are given hereinbelow.

Interrogator system 100 also comprises first and second receiver systems 107, 108. First receiver system 107 is configured to receive signals from first interrogation signal source 105 (wavelengths 1-4 in the example of FIG. 1), and second receiver system 108 is configured to receive signals from second interrogation signal source 106 (wavelengths 5-8 in the example of FIG. 1), after they have returned from the sensor arrays 101, 102.

First signal source 105 and second receiver system 108 are connected to wavelength multiplexer 109. Multiplexer 109 is configured to couple wavelengths 1-4 from first signal source 105 onto trunk fibre 103, and to couple wavelengths 5-8 from trunk fibre 103 to second receiver system 108. Second signal source 106 and first receiver system 107 are connected to wavelength multiplexer 110. Multiplexer 110 is configured to couple wavelengths 5-8 from second signal source 106 onto trunk fibre 104, and to couple wavelengths 1-4 from trunk fibre 104 to first receiver system 107.

Trunk fibre 103 is connected at its distal end to port 1 of optical circulator 111.

Port 2 (to which light arriving at port 1 is directed) of circulator 111 is coupled to first sensor array 101 which is configured to be interrogated by wavelengths output by first signal source 105 (wavelengths 1-4 in the example of FIG. 1). The output of first sensor array 101 is coupled to port 3 of optical circulator 112 such that signals output from first sensor array 101 are directed through port 1 of circulator 112 to trunk 104, and then by multiplexer 110 to first receiver system 107.

Port 2 (to which light arriving at port 1 is directed) of circulator 112 is coupled to second sensor array 102 such that signals from second signal source 106 are coupled, via multiplexer 110 to second sensor array 102 which is configured to be interrogated by the wavelengths output by second signal source 106. The output of second sensor array 102 is coupled to port 3 of circulator 111 such that signals output from second sensor array 102 are directed through port 1 of circulator 111 to trunk 103, and then by multiplexer 109 to second receiver system 108.

The boxed charts in FIG. 1 are provided to show the wavelengths and their relative powers in the system of FIG. 1. These are exemplary only and do not restrict the wavelength plans to those shown.

The arrangement of FIG. 1 thereby enables the interrogation of two sensor arrays using distinct groups of wavelengths via a single pair of trunk fibres without increasing the number of high power signals carried by each fibre. Each trunk fibre carries high-power interrogation signals for one of the sensor arrays, and low-power interrogation signals returning from the other sensor array. The power of the returning signals is insignificant compared to the transmitted signals due to the loss of the sensor arrays. The optical power in each trunk fibre is therefore effectively the same as a conventional system interrogating only a single array. The power of each signal can therefore be maintained without incurring non-linear penalties, while doubling the number of arrays interrogated by each pair of trunk fibres. Furthermore, the returning signals counter-propagating to the high-power signals are at a different wavelength to those high-power signals. The OSNR of the returning signals is not therefore affected by scattered light from the high power signals. That is, the high power signals tend to produce counter-propagating optical noise at their wavelength due to Rayleigh scattering in the optical fibres. That noise would degrade the OSNR of returning signals if they were at the same wavelength. Also, the circulators act as isolators in the optical paths, preventing the formation of cavities between partially reflecting components which can cause system degradation.

Time division multiplexing may be utilised as in conventional systems such that multiple sensors can be interrogated by each wavelength.

Figure 2:
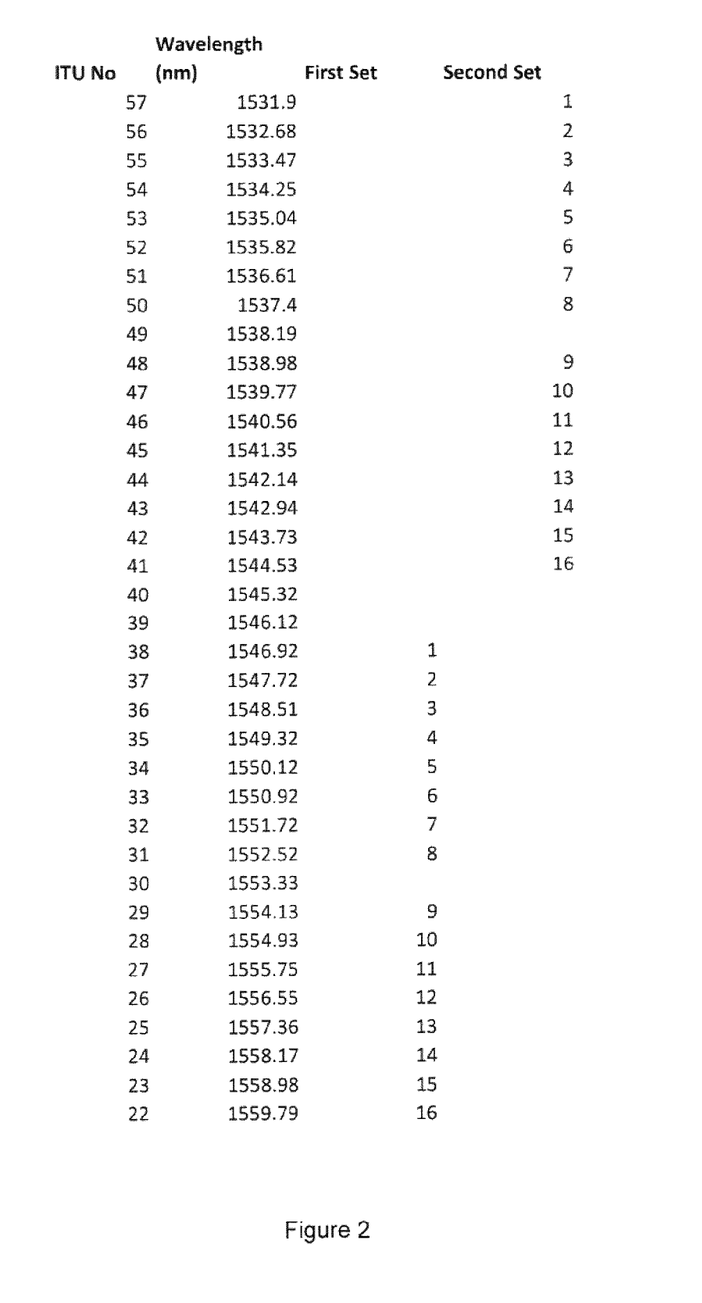
FIG. 2 shows an example wavelength chart.

FIG. 2 shows an example wavelength plan for use with the system shown in FIG. 1. Each sensor array is interrogated by 16 wavelengths on the 100 GHz ITU grid for convenient compatibility with telecommunications components. A 2-channel space is left between the two groups of wavelengths which is the cross-over region of the multiplexers. If the wavelength plan of FIG. 2 is implemented in the system of FIG. 1, the first optical source 105 would output ITU channels 41-48, and 50-57, and the second optical source 106 would output ITU channels 22-29, and 31-38. As will be appreciated this is an example system only and any wavelength groupings for which suitable multiplexers can be produced may be utilised.

In alternative systems optical circulators 111, 112 may be replaced with wavelength division multiplexers. Circulator 111 would be replaced with a multiplexer having the same characteristics as multiplexer 109, and circulator 112 with a multiplexer having the same characteristics as multiplexer 110. The resultant signal routing is the same as described with reference to FIG. 1. If wavelength multiplexers are used in place of the circulators, optical isolators may be required at certain points in the system to prevent the formation of optical cavities between partial reflectors which may resonate and decrease optical performance.

Figure 3:
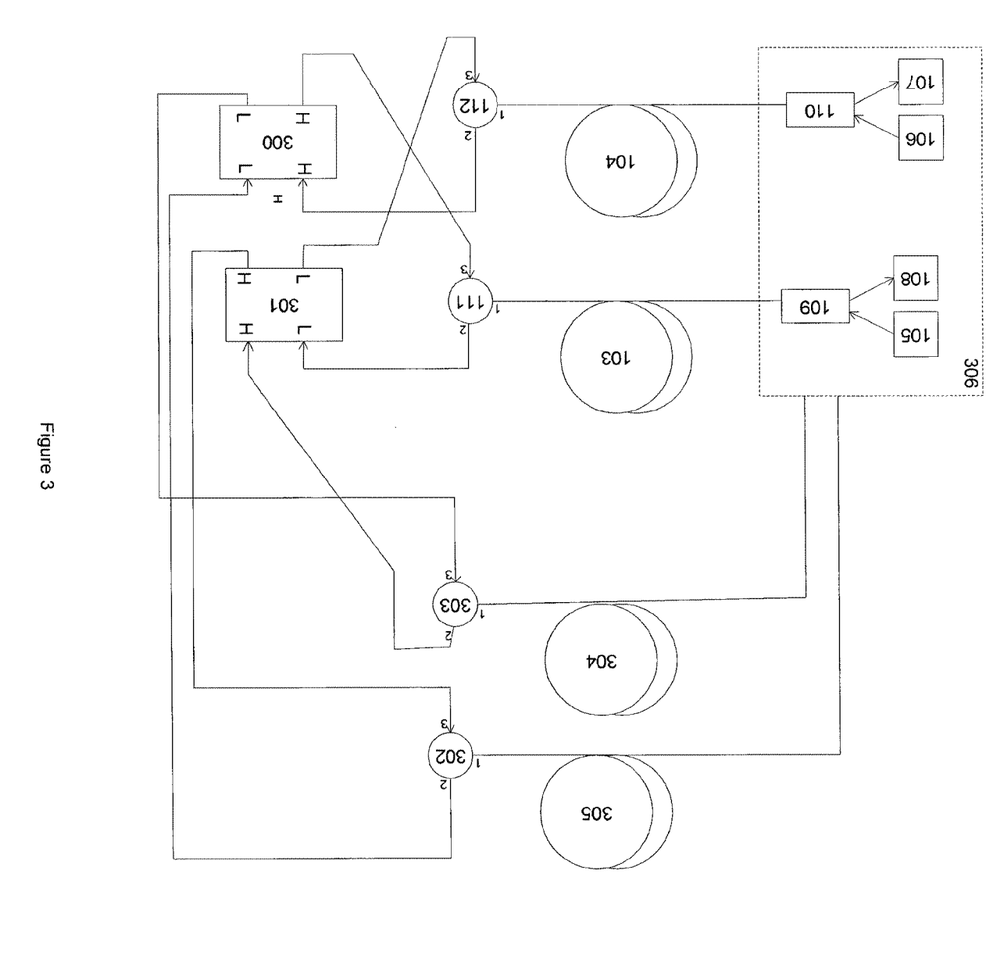
FIG. 3 shows a schematic diagram of an optical sensing system providing redundant connections.

FIG. 3 shows an alternative configuration of the system of FIG. 1 which provides redundancy to enable sensing operation to continue should fibre breaks or failures occur.

Sensor arrays 300, 301 are connected as described with reference to FIG. 1 hereinbefore, but the arrays may be interrogated by two different wavelength groups and each sensor in each array may be interrogated via two different optical paths. Each sensor array thus has inputs and outputs for sensing signals at the high and low wavelength groups described previously. Each of the sensor arrays is connected to circulators 111, 112 as described above, via the appropriate connections, to enable interrogation by the wavelengths described above. However, the other inputs and outputs (Low for sensor array 300, High for sensor array 301) are connected to circulators 302, 303, which are connected to trunk fibres 304, 305 as described above. The trunk fibres 304, 305, and circulators 302, 303, thereby provided a redundant path from the interrogator location 306 to the sensor arrays.

Should a failure occur in the 'primary' system (trunk fibres 103, 104, circulators 111, 112) the system can be reconnected at the interrogator location to interrogate the sensors via fibres 304, 305, and circulators 302, 303. Furthermore, where a failure occurs within a sensor array, continued operation maybe possible utilising the other input/output ports of the sensor arrays. This principle is described in detail in co-pending application no. PCT/GB2011/050789 the disclosure of which is incorporated herein by reference.

Should a failure occur in fibres 103 or 104 connections at the interrogator 306 may be reconfigured to connect the multiplexer 110 to fibre 304, and multiplexer 109 to fibre 305. The result of the reconfiguration is sensor array 300 being interrogated by low wavelengths from transmitter 105, and sensor array 301 by high wavelengths from transmitter 106. If a failure occurs within sensor arrays 300, 301, interrogator 306 may be reconfigured to direct certain wavelength signals via fibres 103, 104, and certain wavelengths via fibres 304, 305, such that interrogation of sensor arrays 300, 301 is accomplished from both 'ends' as described in co-pending application no. PCT/GB2011/050789. The reconfiguration performed is determined by the configuration of the sensor array and location of the failure, and can be logically determined from those factors.

Figure 4:
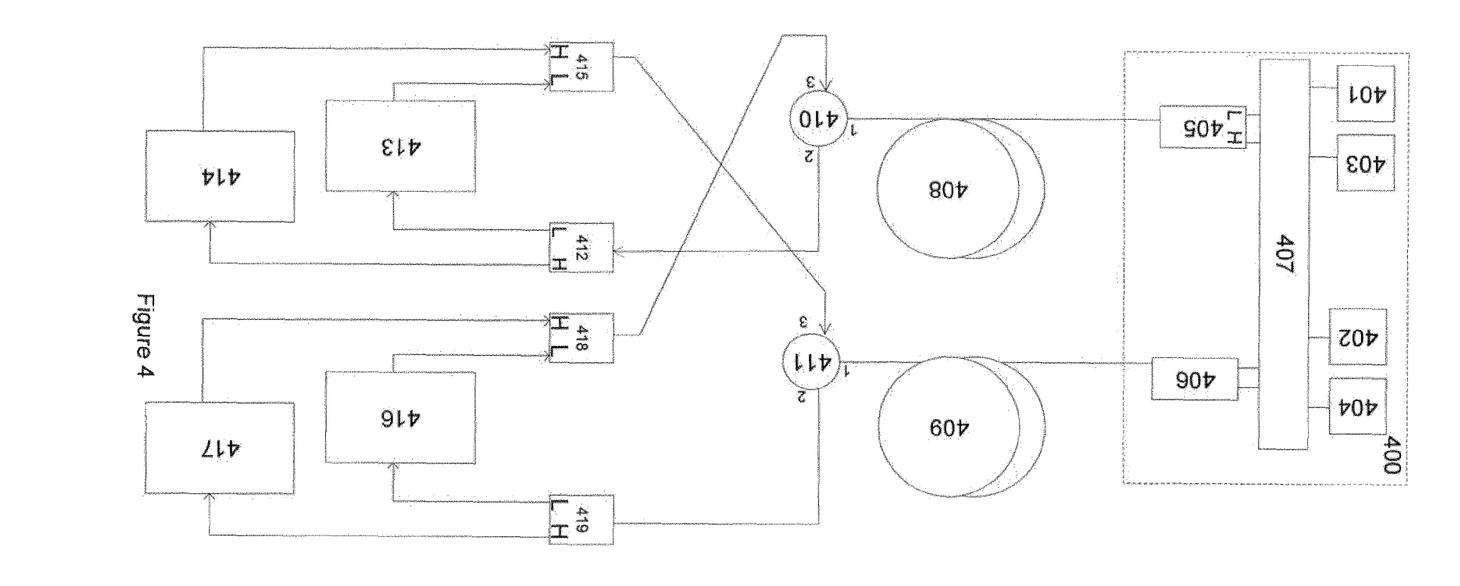
FIG. 4 shows a schematic diagram of an optical sensing system.

FIG. 4 shows a schematic diagram of an extension of the system shown in FIG. 1. The system of FIG. 4 doubles the number of sensor arrays that can be interrogated, without increasing the number of trunk fibres, provided only 50% of the arrays are active at a time. Interrogator 400 comprises signal sources 401, 402 which output a plurality of interrogation signals, each at a different wavelength. In the example of FIG. 4, source 401 outputs a 'low' set of wavelengths, while source 402 outputs a 'high' set of wavelengths. The words low and high are used to indicate two groups of wavelengths, and do not necessarily reflect the actual relationship of the wavelengths utilised.

Interrogator system 400 also comprises first and second receiver systems 403, 404. First receiver system 403 is configured to receive signals from first interrogation signal source 401 (i.e. 'low' wavelengths), and second receiver system 404 is configured to receive signals from second interrogation signal source 402 (i.e. 'high' wavelengths), after they have returned from sensor arrays.

Sources 401, 402, and receivers 403, 404 are connected to wavelength multiplexers 405, 406 via an optical switch 407. Optical switch 407 enables each source and receiver to be optically connected to either trunk fibre 408, 409. Trunk fibres are connected to optical circulators 410, 411 as described hereinbefore in relation to FIG. 1. Wavelength multiplexers 405, 406 multiplex or demultiplex (depending on direction) the high and low wavelengths. That is, low wavelengths arriving at ports 405C and 406C are output at ports 405L and 406L respectively and high wavelengths are output at ports 405H and 406H respectively. Interrogator 400 can thus direct the low or high wavelength sources 401, 402 to either trunk fibre, and receive low or high wavelengths arriving from either trunk fibre at the correct receiver 403, 404. In an alternative configuration the optical switch 407 may be located between the multiplexers 405, 406 and the trunk fibres 408, 409.

Port 2 of optical circulator 410 (i.e. the port from which signals transmitted from the interrogator through trunk fibre 408 will exit is coupled to wavelength multiplexer 412. Multiplexer 412 multiplexes or demultiplexes (depending on direction) the high and low wavelengths. That is, low wavelengths arriving at port 412C are output at port 412L and high wavelengths are output at port 412H.

Port 412L is coupled to a first sensor array 413, which sensor array is configured to be interrogated by the low wavelength group. Port 412H is coupled to second sensor array 414, which is configured to be interrogated by the high wavelength group. The outputs of sensor arrays 413, 414 are multiplexed by multiplexer 415 whose output is connected to port 3 of circulator 411 such that signals from sensor arrays 413, 414 are directed to trunk fibre 409 and then to interrogator 400. Sensor arrays 416, 417 are connected in the same manner via multiplexers 418, 419.

The system of FIG. 4 can thus interrogate the sensor arrays in two combinations. With low wavelengths directed to trunk 408 and received from trunk 409, and high wavelengths directed to trunk 409 and received from trunk 408, sensor arrays 413 and 416 are interrogated. With low wavelengths direct to trunk 409 and received from 408, and high wavelengths directed to trunk 408 and received from trunk 409, sensor arrays 414 and 417 are interrogated. In each of these configurations the trunk fibres each carry a high or a low set of high power interrogation signals, and the opposite set of low power signals returning to the interrogator. The characteristics discussed hereinbefore of minimising optical power and avoiding bi-directional transmission of the same wavelengths are therefore retained, but the number of arrays that can be interrogated through a pair of trunk fibres is doubled, albeit with only 50% at a time.

Figure 5:
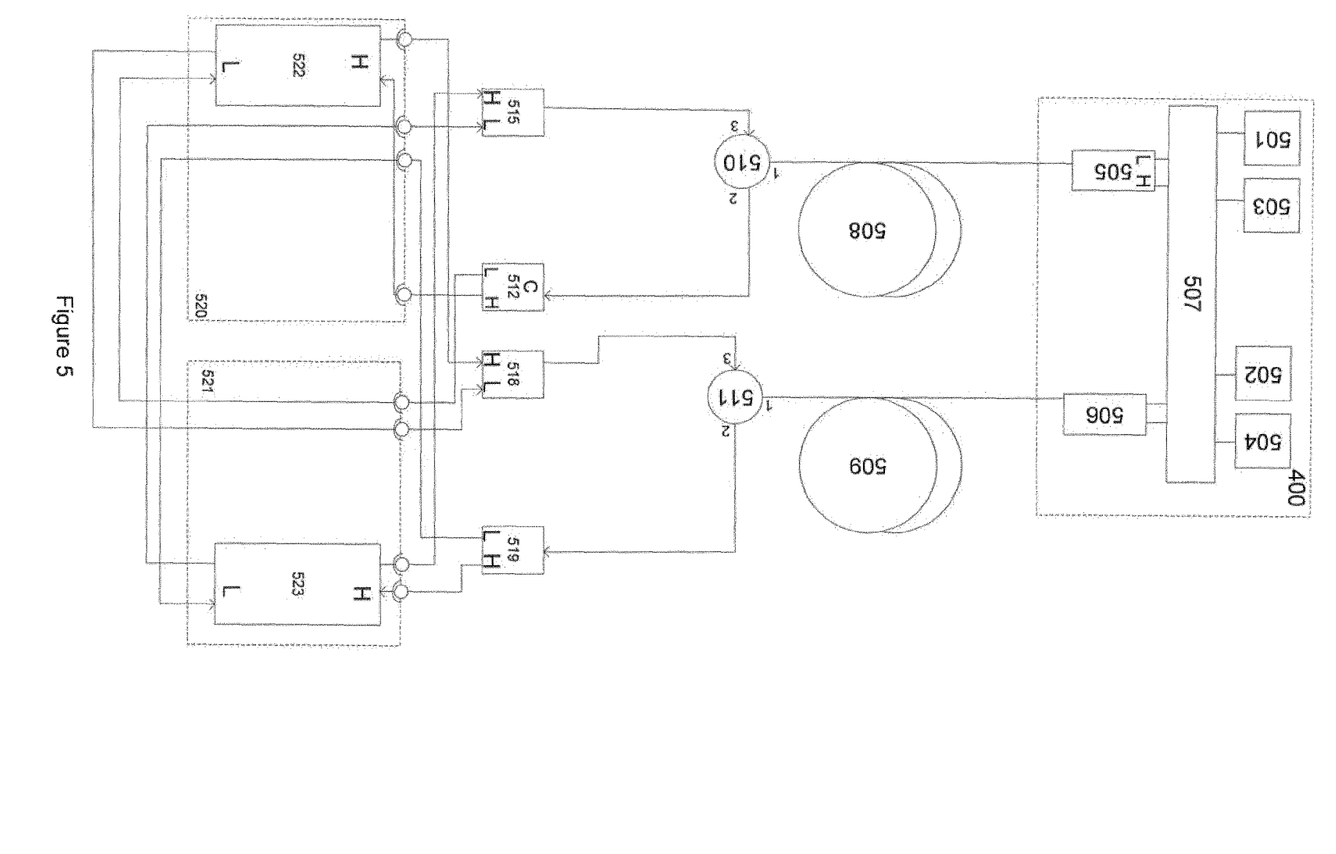
FIG. 5 shows a schematic diagram of an optical sensing system providing redundant connections.

FIG. 5 shows a further system for providing redundancy in certain parts of the system. The interrogator 500, trunk fibres 508, 509, circulators 510, 511, and wavelength multiplexers 512, 515, 518, 519 are configured as shown in FIG. 4. However, multiplexers 512, 515, 518, 519 are connected to two sensor cables 520, 521. Each sensor cable 520, 521 comprises a sensor array 522, 523 which may be interrogated by the high or low wavelength groups via different ports. Through-fibres in each sensor cable are utilised to provide redundant signal paths to the other sensor cable. This system enables operation to continue in the event of a total fibre break in one of the sensor cables. In the example of FIG. 5, each sensor cable 520, 521 is connected to the circulator via a 4-way connector.

Reconfiguration of the interrogator as described in relation to FIG. 4 enables selection of which sensor array is interrogated by which wavelength group. That is, in a first configuration the sensor array 520 is interrogated by the high wavelengths and the sensor array 521 by the low wavelengths. In a second configuration the sensor array 520 is interrogated by the low wavelengths and the sensor array 521 by the high wavelengths. This reconfiguration may allow improved performance after a failure within one of the sensor arrays.

The interrogator may also be configured to direct selected signals through either trunk fibre. That is, a mixture of high and low wavelengths may be directed to each trunk fibre 508, 509. Therefore each trunk fibre may carry wavelengths from the high and low wavelength groups. However, the previously noted behaviour whereby there will not be counter-propagating signals at a certain wavelength in a trunk fibre still applies due to the multiplexer and circulator configuration.

Figure 6:
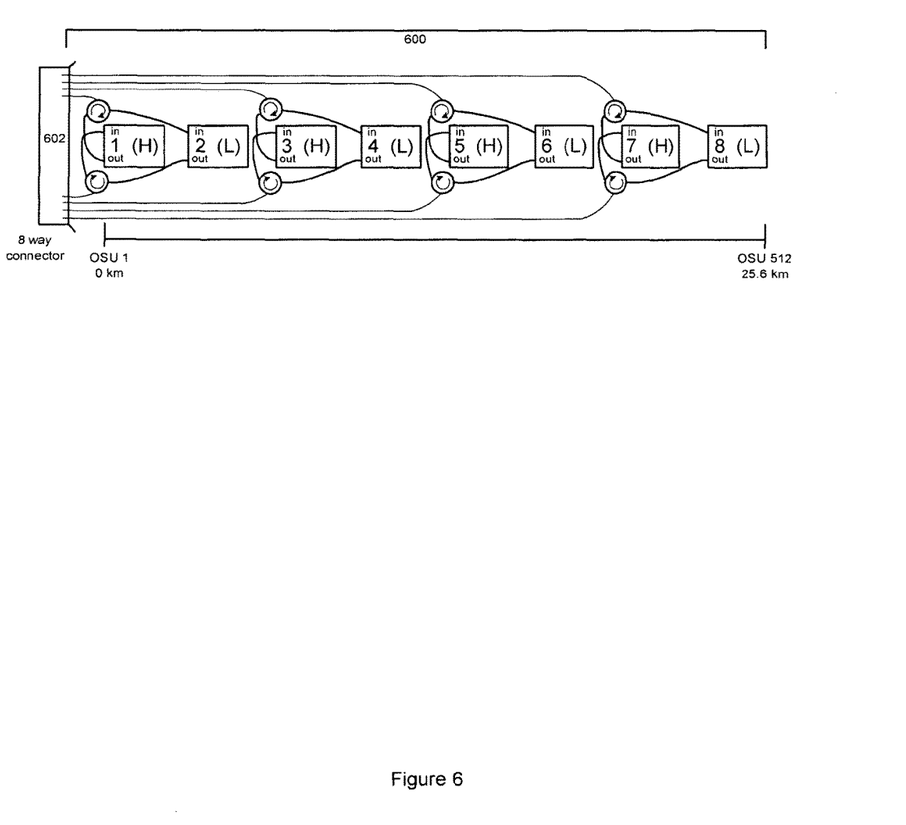
FIG. 6 shows a schematic diagram of an exemplary sensing cable.

In the above description, the circulators have been described as being located at the end of the trunk fibres. However, as will be appreciated the location of those circulators may be varied dependent on system design without affecting the functions and principles provided by the system configurations described. For example, FIG. 6 shows a configuration of sensor arrays 1-8 (H & L indicate interrogation wavelengths as described hereinbefore) along a sensor cable 600. The sensor cable is connected to the trunk fibre by an 8-way connector 602, and all circulators (un-numbered, shown with an arrow in a circle), connecting fibres, and sensors 1-8 are within, or along the length of, the sensor cable 600. The connection of pairs of sensor arrays is as described hereinbefore. That is, sensor arrays 1, 2 are connected to a pair of trunk fibres as shown in FIG. 1. Sensor arrays (3, 4), (5, 6), & (7, 8) are similarly connected to pairs of trunk fibres. Eight sensor arrays are therefore connected via four pairs of trunk fibres. This arrangement doubles the number of sensor arrays per fibre pair compared to the prior art. As will be appreciated the trunk fibres may be provided as a single or multiple cables.

Figure 7:
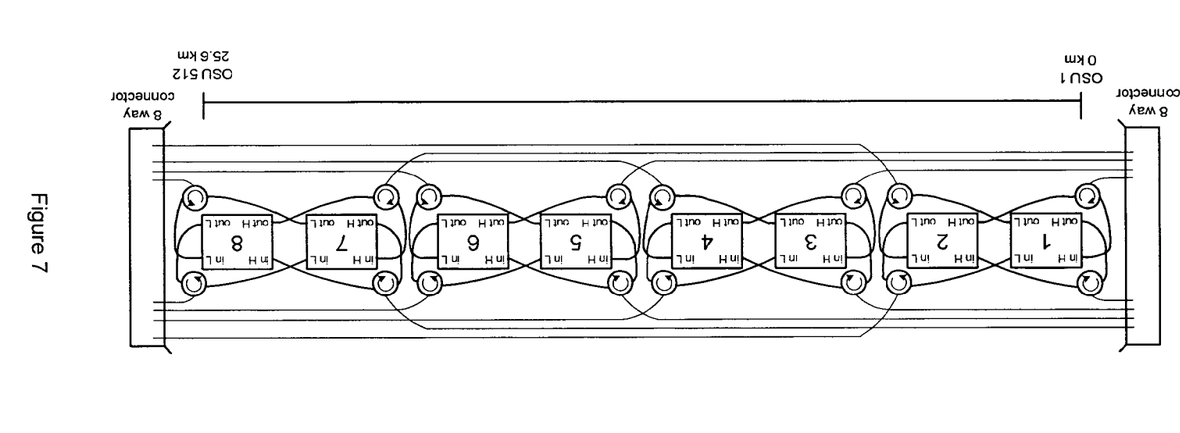
FIG. 7 shows a schematic diagram of an exemplary sensing cable with redundant connections.

FIG. 7 shows a further example of a sensing cable comprising 8 sensor arrays. The arrays are connected utilising the principles described in relation to FIG. 3. Each sensor array is connected to two pairs of trunk fibres which connect the arrays back to the interrogator. A first connection to each array is from a first end of the sensor cable, and the second connection is to the second end of the sensor cable. This configuration provides redundant connections to each sensor array, and in the event of a break along the length of the sensor cable ensures sensors can still be interrogated from at least one end of the sensor cable.

The sensor arrays shown in FIGS. 6 and 7 may be spaced apart along the sensor cable to provide the required sensor locations.

Where in any of the foregoing description a fibre, connection or component is described in the active sense as carrying or guiding a particular wavelength, it will be understood that this is for clarity only and that the language is intended to specify the relevant part may carry those wavelengths, or is configured to do so. Clearly, the wavelengths will only be present when a light source is feeding the wavelength to the system, and the presence or absence of such a source does not affect the physical structure of the system that is described herein.

The description has been primarily directed to a system in which the interrogator system is located on the surface and the sensors arrays on the sea bed. However, as will be appreciated the interrogator system may be located elsewhere, for example on the sea-bed. The term 'trunk cable' has therefore been used to describe the connection of the sensor arrays to the interrogator, but this may be in the form of a riser cable where the interrogator is on the surface.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. An optical sensing system, comprising
an interrogator system comprising
a first optical signal source configured to output a first set of optical interrogation signals;
a second optical signal source configured to output a second set of optical interrogation signals, the wavelengths of the first and second sets of optical interrogation signals being distinct;
a first optical sensor array configured to be interrogated by the first set of optical interrogation signals;
a second optical sensor array configured to be interrogated by the second set of optical interrogation signals;
a first optical receiver, for receiving the first set of optical interrogation signals;
a second optical receiver for receiving the second set of optical interrogation signals
a first optical connection for coupling the first set of optical interrogation signals from the first optical signal source to the first sensor array, and for coupling optical signals from the second sensor array to the second optical receiver; and
a second optical connection for coupling the second set of optical interrogation signals from the second optical signal source to the second sensor array, and for coupling optical signals from the first sensor array to the first optical receiver.

2. An optical sensing system according to claim 1, wherein the first optical connection comprises a first trunk fibre connecting the first optical signal source and the second optical receiver to a first optical circulator coupled to the first and second sensor arrays, and the second optical connection comprises a second trunk fibre connecting the second optical signal source and the first optical receiver to a second circulator coupled to the first and second sensor arrays.

3. An optical sensing system according to claim 1, wherein the first optical connection comprises a first trunk fibre connecting the first optical signal source and the second optical receiver to a first wavelength division multiplexer coupled to the first and second sensor arrays, and the second optical connection comprises a second trunk fibre connecting the second optical signal source and the first optical receiver to a second wavelength division multiplexer coupled to the first and second sensor arrays.

4. An optical sensing system according to claim 1, wherein the first sensor array is configured to also be interrogated by the second set of optical interrogation signals, and the second sensor array is configured to also be interrogated by the first set of optical interrogation signals.

5. An optical sensing system according to claim 1, further comprising a third optical connection for coupling the first set of wavelengths from the interrogator system to the second sensor array and the second set of wavelengths from the first sensor array to the interrogator system, and a fourth optical connection for coupling the second set of wavelengths from the interrogator system to the first sensor array and the first set of wavelengths from the second sensor array to the interrogator system.

6. An optical system according to claim 1, wherein the first and second sets of optical signals each comprise 8 or 16 discrete signals.

7. An optical sensing system, comprising
an interrogator system comprising
a first optical signal source configured to output a first set of optical interrogation signals;
a second optical signal source configured to output a second set of optical interrogation signals, the wavelengths of the first and second sets of optical interrogation signals being distinct;
a first primary optical sensor array configured to be interrogated by the first set of optical interrogation signals and a first secondary optical sensor array configured to be interrogated by the second set of optical interrogation signals;
a second primary optical sensor array configured to be interrogated by the second set of optical interrogation signals and a second secondary optical sensor array configured to be interrogated by the first set of optical interrogation signals;
a first optical receiver, for receiving the first set of optical interrogation signals;
a second optical receiver for receiving the second set of optical interrogation signals;
a first optical connection for coupling the first set of optical interrogation signals from the first optical signal source to the first primary sensor array, the second set of optical interrogation signals from the second optical signal source to the first secondary sensor array, the second set of optical interrogation signals from the second primary sensor array to the second optical receiver, and the first set of optical interrogation signals from the second secondary sensor array to the first optical receiver,
a second optical connection for coupling the second set of optical interrogation signals from the second optical signal source to the second primary sensor array, the first set of optical interrogation signals from the first optical signal source to the second secondary sensor array, the first set of optical interrogation signals from the first primary sensor array to the first optical receiver, and the second set of optical interrogation signals from the first secondary sensor array to the second optical receiver,
wherein the system is configured such that each wavelength does not propagate bidirectionally in the first or second optical connection by interrogating only the primary or only the secondary sensors arrays at any time.

8. An optical sensing system according to claim 7, wherein each optical connection comprises wavelength division multiplexers to separate the first and second sets of optical signals, and each optical connection comprises an optical circulator at the end distal from the interrogator system connecting the each optical connection to the first and second sensor arrays.

9. An optical sensing system, comprising
an interrogator system comprising
a first optical signal source configured to output a first set of optical interrogation signals;
a second optical signal source configured to output a second set of optical interrogation signals, the wavelengths of the first and second sets of optical interrogation signals being distinct;
a first optical sensor array configured to be interrogated by the first set of optical interrogation signals and by the second set of optical interrogation signals;
a second optical sensor array configured to be interrogated by the second set of optical interrogation signals and by the first set of optical interrogation signals;

a first optical receiver, for receiving the first set of optical interrogation signals;

a second optical receiver for receiving the second set of optical interrogation signals;

a first optical connection for coupling the first and second sets of optical interrogation signals from the first and second optical signal sources to the first sensor array, and the first and second sets of optical interrogation signals from the second secondary sensor array to the first and second optical receivers, a second optical connection for coupling the first and second sets of optical interrogation signals from the first and second optical signal sources to the second sensor array, and the first and second sets of optical interrogation signals from the first sensor array to the first and second optical receivers, wherein the system is configured such that each wavelength does not propagate bidirectionally in the first or second optical connection.

10. An optical sensing system according to claim 9, wherein each optical connection comprises wavelength division multiplexers to separate the first and second sets of optical signals, and each optical connection comprises an optical circulator at the end distal from the interrogator system connecting the each optical connection to the first and second sensor arrays.

* * * * *